US008369534B2

(12) United States Patent
Johnson et al.

(10) Patent No.: US 8,369,534 B2
(45) Date of Patent: Feb. 5, 2013

(54) MODE SWITCHING NOISE CANCELLATION FOR MICROPHONE-SPEAKER COMBINATIONS USED IN TWO WAY AUDIO COMMUNICATIONS

(75) Inventors: Timothy M. Johnson, San Jose, CA (US); Lawrence F. Heyl, Colchester, VT (US); Wendell B. Sander, Los Gatos, CA (US); Douglas M. Farrar, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/433,064

(22) Filed: Mar. 28, 2012

(65) Prior Publication Data

US 2012/0183159 A1 Jul. 19, 2012

Related U.S. Application Data

(63) Continuation of application No. 12/535,570, filed on Aug. 4, 2009, now Pat. No. 8,150,058.

(51) Int. Cl.
*H04B 3/00* (2006.01)

(52) U.S. Cl. ..... 381/77; 381/123; 381/111; 379/387.01; 379/388.05; 330/69

(58) Field of Classification Search ............ 381/71.1, 381/77, 123, 111, 56, 57, 61, 74, 94.1, 107, 381/370, 375, 376; 379/387.01, 388.05; 330/67
See application file for complete search history.

(56) References Cited

U.S. PATENT DOCUMENTS

| 5,033,090 | A | 7/1991 | Weinrich |
| 5,208,865 | A * | 5/1993 | Friske et al. .............. 381/94.5 |
| 5,408,533 | A | 4/1995 | Reiffin |
| 5,692,042 | A | 11/1997 | Sacca |
| 6,016,136 | A | 1/2000 | Fado et al. |
| 6,060,933 | A | 5/2000 | Jordan et al. |
| 6,091,937 | A | 7/2000 | Uhlemann |
| 2007/0049103 | A1 * | 3/2007 | Kashi et al. .................. 439/396 |
| 2007/0273438 | A1 | 11/2007 | Hickman et al. |

OTHER PUBLICATIONS

Non-Final Office Action (dated Dec. 31, 2009), U.S. Appl. No. 12/535,570, filed Aug. 4, 2009, First Named Inventor: Timothy M. Johnson, (21 pages).
Final Office Action (dated Apr. 27, 2010), U.S. Appl. No. 12/535,570, filed Aug. 4, 2009, First Named Inventor: Timothy M. Johnson, (19 pages).
"Feature-Rich, Complete Audio Record/Playback for GSM/GPRS Cell Phones", MAXIM Integrated Products, Sunnyvale, CA, USA, Sep. 12, 2005, (8 pages).
"Op Amp Circuit Collection", AN-31, National Semiconductor, Application Note 31, Sep. 2002, (33 pages).
"Stereo Audio CODECs with Microphone, DirectDrive Headphones, Speaker Amplifiers, or Line Outputs", MAX9851/MAX9853, MAXIM Integrated Products, Sunnyvale, CA, USA, 19-3732; Rev. 2; Jul. 2007, (71 pages).

* cited by examiner

*Primary Examiner* — Vivian Chin
*Assistant Examiner* — Paul Kim
(74) *Attorney, Agent, or Firm* — Blakely, Sokoloff, Taylor & Zafman LLP

(57) ABSTRACT

An audio host device has an electrical interface having a speaker contact, a microphone contact, and a reference contact. The reference contact is shared by a microphone and a speaker. The reference contact is also directly coupled to a power return plane of the audio host device. A difference amplifier is provided, having a cold input and a hot input. The hot input is coupled to the microphone contact. A switched attenuator circuit is also provided that has first and second states. In the first state, the attenuator circuit couples a sense point of the reference contact to the cold input, while in the second state the cold input is isolated from the reference sense point. Other embodiments are also described and claimed.

15 Claims, 5 Drawing Sheets

MODE SWITCHING NOISE CANCELLATION FOR MICROPHONE-SPEAKER COMBINATIONS USED IN TWO WAY AUDIO COMMUNICATIONS

RELATED MATTERS

This application is a continuation of U.S. patent application Ser. No. 12/535,570, filed Aug. 4, 2009, entitled "Mode Switching Noise Cancellation for Microphone-Speaker Combinations Used in Two Way Audio Communications", which issued as U.S. Pat. No. 8,150,058 on Apr. 3, 2012.

An embodiment of the invention relates to noise cancellation techniques that improve headset-based audio communications using a portable host device. Other embodiments are also described.

BACKGROUND

For two-way, real-time audio communications, referred to here generically as voice or video telephony, a user can wear a headset that includes a single earphone (also referred to as a headphone or a speaker) and a microphone, or a pair of stereo earphones and a microphone, that are connected to a host communications device such as a smart phone. The headset, which is said to integrate the earphones with a microphone, may be connected to the host device through a 4-conductor electrical interface typically referred to as a headset plug and jack matching pair. The 4-conductors are used as follows: a pair of them is used for the left and right earphone signals, respectively; one of them connects the microphone signal; and the last one is a reference or power return, conventionally taken as the audio circuit reference potential. The plug that is at the end of the headset cable fits into a mating 4-conductor jack that is integrated in the housing of the host device. Connections are made within the host device from the contacts of the headset jack to various audio processing electronic components of the host device.

The packaging restrictions in certain types of host devices such as a smart phone or a cellular phone create difficult challenges for routing the signal and power lines. For example, the headset jack is often located distant from the main logic board on which the audio processing components are installed, so that the headset signal needs to be routed through a flexible circuit and one or more board-to-board connectors. The multiple connections to in effect what is a distributed ground plane, as well as the manner in which the connections are made namely through narrow or thin metal traces, and can lead to the creation of audio noise during operation of the host device. In addition, with the shared nature of the headset's reference or ground contact (shared by the microphone and the earphones of the headset), further noise current is produced at the output of a microphone signal amplifier. This amplifier (also referred to as a microphone preamplifier) provides an initial boost to the relatively weak microphone signal that is received from the headset. The practical effect of such audio noise at the output of the microphone preamplifier may be that the listener at the far end of a telephone conversation hears an echo of her own voice, and/or a reduction in the quality of the sound heard by the far end listener (also referred to as degraded signal to noise ratio).

Attempts to reduce (or, as generically referred to here, "cancel") the noise at the output of the microphone preamplifier have been made. In one case, the concept of differentially sensing the microphone signal is used. For this purpose, a differential amplifier (in contrast with a single-ended one) is used to only amplify the difference between the voltage at a sense point for the headset ground contact and the voltage at a sense point for the microphone signal contact. Using such a configuration, any alternating current (AC) voltages that may appear as noise between a local ground (local to the microphone preamp integrated circuit) and the ground that is near the headset jack or socket are largely rejected (that is, not significantly amplified), while the AC signal on the microphone signal contact is amplified.

SUMMARY

The generally irregular routing of the microphone and speaker signals and their common return in the host device leads to a common mode imbalance that can cause undesired common mode noise to be coupled into either a microphone signal loop or a speaker signal loop. In practice the microphone signal loop is more prone to contamination by offensive audio band noise. In addition, the irregular routing of the audio signals represents a finite impedance that can act as a victim impedance for near-by sources of noise within the host device, whether of low frequency similar to the audio base bandwidth, frequencies subject to heterodyning or fold over by sampled data converters, or non-linear impedances capable of demodulating local radio frequency energy.

The differential sensing approach described above in the Background section for ameliorating microphone preamp noise falls short, when the following practical considerations are taken into account. First, there are several different types of microphone-speaker combinations in the marketplace, each of which may have a different type of microphone circuit. Moreover, there are manufacturing variations in the microphone circuit, even for the same make and model of microphone-speaker combination. Finally, manufacturing as well as temperature variations will affect the electrical characteristics of a flexible circuit or board-to-board connector that is used to connect with the microphone-speaker combination interface within the host device. Any successful attempt to cancel the microphone preamp noise, by differentially sensing the microphone signal, will require knowledge of the precise electrical characteristics of the relevant circuitry, in each instance of the manufactured host device and microphone-speaker combination. This however is not practically possible due to the variations just discussed.

An embodiment of the invention is an improved circuit for reducing microphone preamp noise in a two-way audio communications host device. The circuit provides a more robust solution in that it is able to perform good noise reduction for at least two different types or brands of headsets, whose microphone circuits have different impedances.

A switched attenuator circuit is coupled between a first input of a difference amplifier and a sense point for the reference or ground contact of the electrical interface used by the microphone-speaker combination. The second input of the amplifier is coupled to a sense point for the microphone contact. The attenuator circuit has at least two selectable states. In its first state, the attenuator circuit couples the reference sense point to the first input, e.g. through a resistor ladder network or a voltage divider; in the second state, the first input is isolated from the reference sense point. This enables the difference amplifier to operate in two modes, namely, a differential sensing mode when the attenuator circuit is in the first state, and a single ended mode when the attenuator circuit is in the second state.

In the differential sensing mode, the output of the difference amplifier is proportional to a difference between the voltage at the microphone sense point and an attenuated version of the voltage at the reference sense point. The amount of attenuation may be empirically determined during testing or development of the host device, to be the one that yields best noise reduction for those types of microphone-speaker combinations that are deemed to have a high impedance microphone circuit.

In the single ended mode, the output of the difference amplifier is proportional to the voltage of the microphone sense point; this mode performs better noise cancellation for microphone-speaker combinations that have a low impedance microphone circuit. The impedance ranges that define the low and high impedance microphone circuits may be determined experimentally. For example, a low impedance circuit may be one that exhibits less than 5,000 Ohms in the audio frequency range; a high impedance circuit may be one that exhibits more than 20,000 Ohms. The amount of attenuation that is available in the attenuator circuit depends upon the expected impedance range of the microphone circuits.

A controller may be provided, to set the attenuator circuit into a given state depending upon the type of microphone-speaker combination to which the host device is connected. For example, if the microphone-speaker combination type is one that exhibits low impedance (as seen looking out of the host device and into the microphone of the microphone-speaker combination electrical interface), then single ended mode is selected. The controller achieves this by setting the attenuator circuit into its second state; the amplifier input is thus isolated from the reference sense point. If, however, the microphone impedance is high, then differential mode is selected, by setting the attenuator circuit into its first state where the amplifier input is coupled to the reference sense point.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1A:
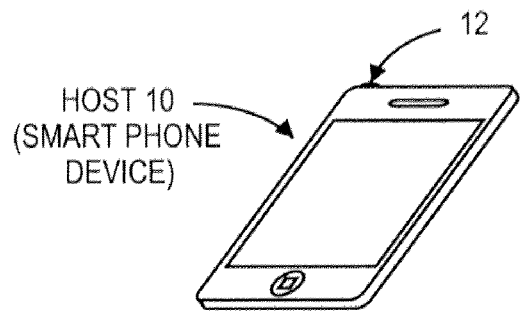
FIGS. 1A-1F shows several different combinations of host devices and microphone-speaker combinations in which one or more embodiments of the invention can appear.
Figure 1B:
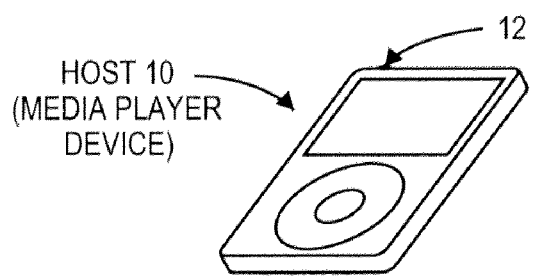
Figure 1C:
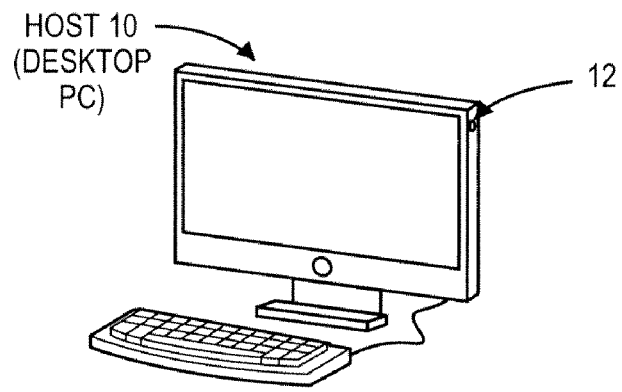
Figure 1D:
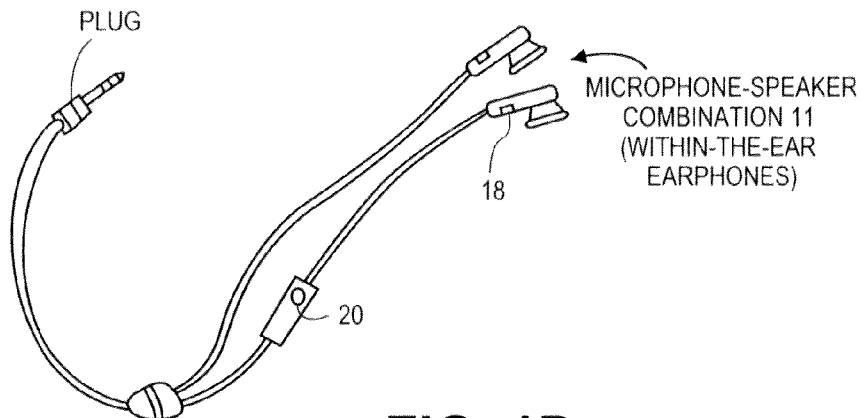
Figure 1E:
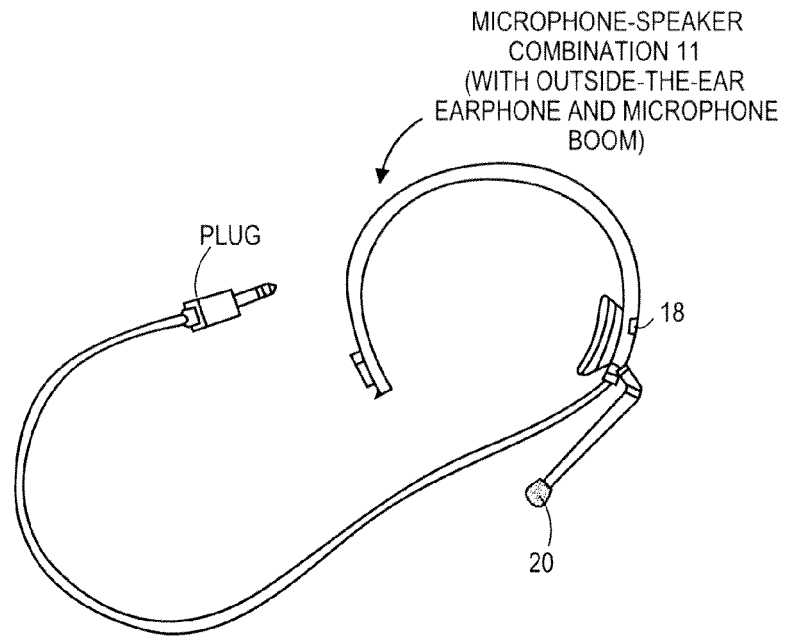

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

FIGS. 1A-1F shows several types of host devices 10 and microphone-speaker combinations 11 in which various embodiments of the invention can be implemented. In particular, a noise reduction (here generally referred to as noise cancellation) mechanism may be integrated entirely within a device housing of the host 10. The host 10 may be a smart phone device (FIG. 1A), a media player device (FIG. 1B), a desktop (FIG. 1C) or a portable personal computer (not shown). The host 10 has a microphone-speaker combination electrical interface 12, which is generically referred to here as a "headset" electrical interface 12, only for convenience. The headset electrical interface 12 may include what is typically referred to as a jack or connector that is integrated into the host housing. Although not shown, the host 10 also includes conventional audio processing components that enable a two way real time audio communications session or conversation (voice or video telephony) between a near end user of the host 10 and far end user. These may include a communications signal processor that produces or transmits an uplink communications signal from the output of a microphone preamplifier (uplink audio signal), and receives a downlink communications signal from which a downlink audio signal is generated. The conversation may be conducted in a cellular network telephone call, a plain old telephone system or analog call, an Internet telephony call, or other duplex voice channel, e.g. a conference call convened by any of the above media or a multimedia application requiring simultaneous voice input and output from two or more users (one or more of which may actually be a synthetic speech recognition and synthesis system).

The host 10 may be coupled to one or more microphone-speaker combinations 11, through its headset electrical interface 12. Several different types of microphone-speaker combinations 11 that can be used are shown, including two different types of headsets (one in which a pair of earphones or headphones are in loose form FIG. 1D, and another where a single earphone is attached to a microphone boom FIG. 1E) and a combination microphone stand and desktop loudspeaker FIG. 1F. Each of these microphone-speaker combinations 11 can be a separate item than the host device 10, and can be coupled to the host device 10 through a cable connector that mates with the headset electrical interface 12 in the housing of the host device 10.

Figure 2A:
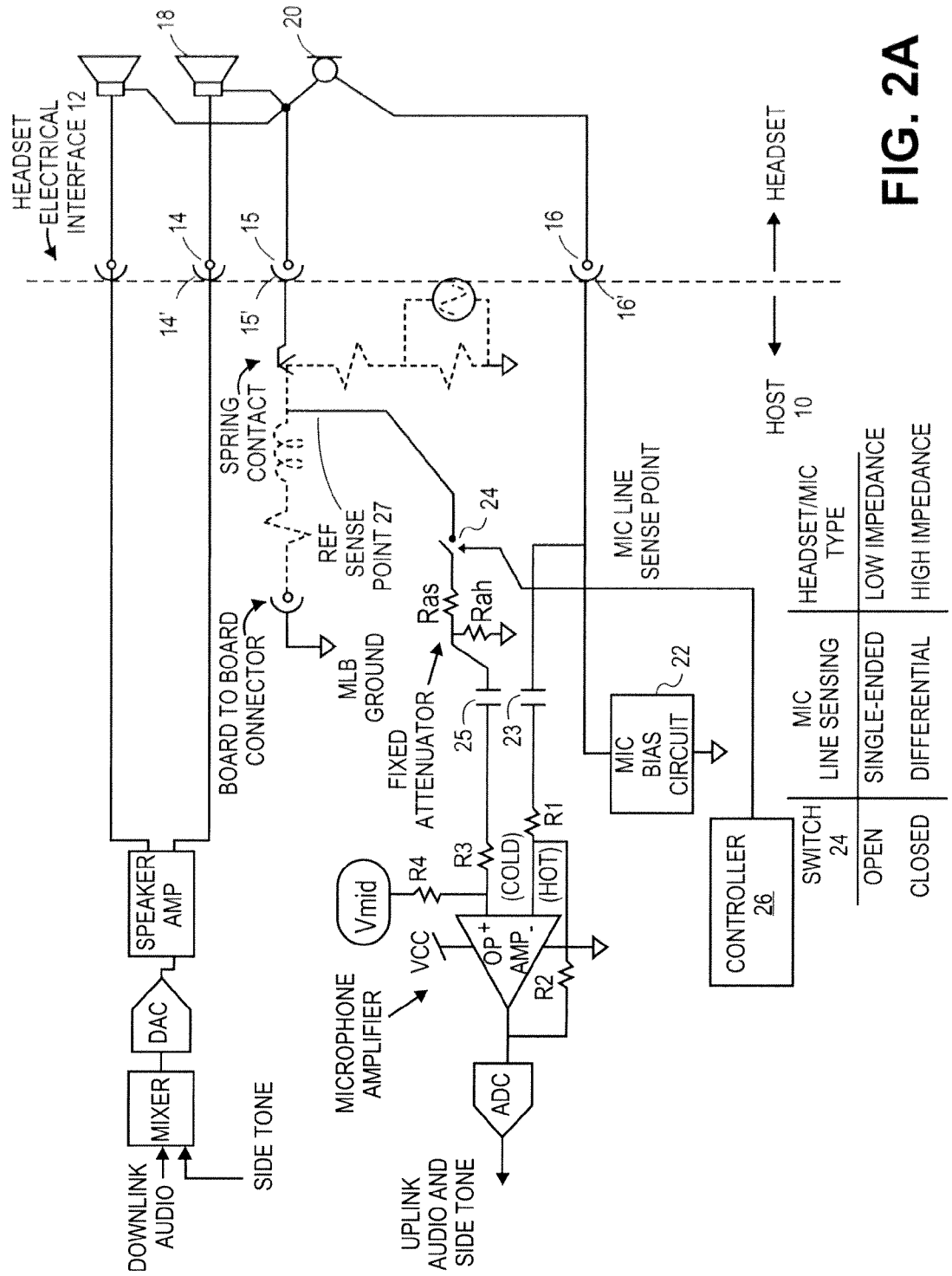
FIG. 2A is a circuit diagram of an embodiment of the invention.

Referring now to FIG. 2A, a circuit schematic of an embodiment of the invention is shown. In this embodiment, each speaker 18 has a power return terminal that is connected to a shared reference or ground contact 15, the latter being located in a cable connector (e.g., a plug). The reference contact 15 in the plug mates with a corresponding reference contact 15' of a host-side connecter (e.g., a jack) integrated in the host 10. A pair of speaker contacts 14 make a direct connection with their respective contacts 14' of the host connector. Finally, the microphone-speaker combination 11 also includes a microphone circuit 20 that shares the reference contact 15 with the speakers 18. The microphone circuit 20 also has a signal output terminal that is connected to its separate microphone contact 16 (which mates with a corresponding microphone contact 16' of the host connector in the host 10). This microphone-speaker combination 11 may be a conventional headset in which the microphone circuit 20 and the speaker 18 are integrated.

In a typical case, all four of the contacts shown in FIG. 2A for the headset electrical interface 12 are integrated in the same connector (e.g., a 4-conductor headset jack in the host 10, and a mating headset plug). Note that although the example here is a headset electrical interface 12 that has four contacts, the concepts of the invention are also applicable to a mono system that requires only three contacts, that is a single speaker contact 18, a shared reference contact 15, and a single microphone contact 16. There may be additional contacts integrated in the headset electrical interface 12 that are not relevant here.

Figure 1F:
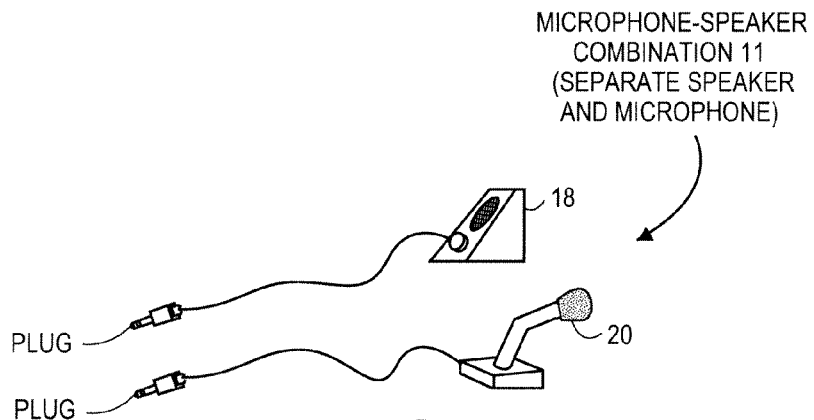
Figure 2B:
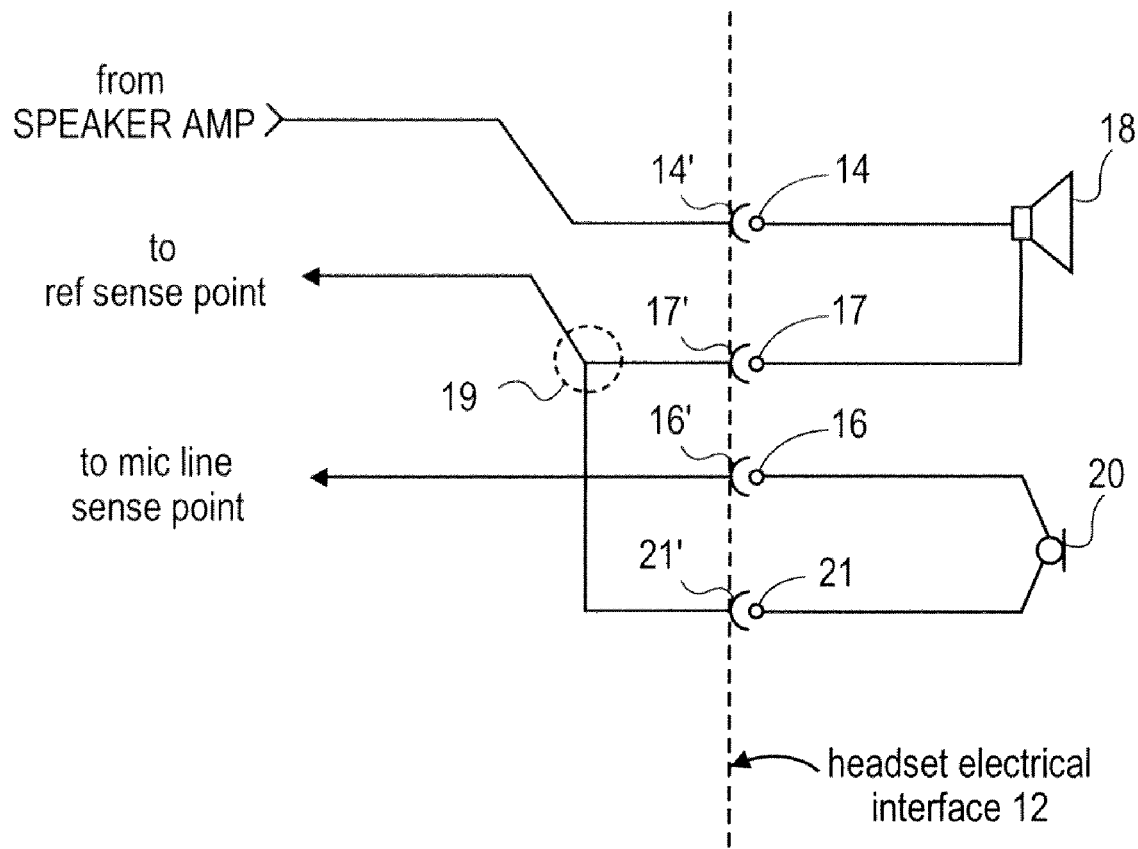
FIG. 2B is a circuit diagram of another possible arrangement for the shared reference contact in the host device.

Note that in FIG. 2A, the reference contact 15' in the host device 10 is a node that is shared, by the return terminals of the speaker 18 and microphone circuit 20. In this case, the return terminals are electrically joined outside the host device 10. An alternative to this scheme is where separate connectors are used for the speaker 18 and the microphone circuit 20, e.g. a microphone stand and a separate desktop speaker as shown in FIG. 1F. The circuit schematic of this embodiment is shown in FIG. 2B. Here, the return terminals of the speaker and microphone are electrically joined inside the host device 10. The speaker and microphone connectors have separate ground contacts 17, 21, and inside the host device 10 a node 19 is joined to the host side contacts 17', 21' as shown.

With the microphone-speaker combination 11 connected to the host, its user can hear the far end user talking during a telephone call and can speak to the far end user at the same time, via the speakers 18 and microphone circuit 20, respectively. The voice of the far end user originates in a downlink communications signal that arrives into the host 10 over a communications network. A downlink audio signal may be in digital form when it is processed by a communications signal processor (not shown) with several stages that may include various digital signal processing stages, including a mixer that allows the addition of sidetone. The downlink audio signal with the sidetone is then converted into analog form using a digital to analog converter (DAC), before being applied to the headset electrical interface 12 by a speaker amplifier. At the same time, the near end user may speak into the microphone circuit 20, which picks up the voice as an uplink audio signal that passes through the headset interface 12 (in particular the microphone contacts 16, 16'). The uplink audio signal is then boosted by the microphone amplifier (preamplifier) and may then be converted into digital form by an analog to digital converter (ADC). This allows the generation of a digital sidetone signal (which is fed back to the speaker 18 as explained above). In addition, the uplink audio signal may be subjected to further digital signal processing before being transmitted to a remote device (e.g., the far end user's host device) over the communications network as an uplink communications signal.

Specifics of the noise cancellation circuitry in the host 10 are now described. Still referring to FIG. 2A, the reference contact 15' is routed or connected to a circuit board layer that is at the ground or reference voltage. This may be the reference relative to which a power supply voltage Vcc is measured, which powers the various electrical circuit components of the host 10, including audio processing components such as the microphone amplifier. The power return plane is also referred to here as the main logic board (MLB) ground.

Due to practical limitations, the electrical connection between the reference contact 15' and the MLB ground is not identically zero Ohms, particularly in the audio frequency range. This may be due to various physical structures that create parasitic or stray effects, represented in FIG. 2A by virtual resistors, capacitors and inductors shown in dotted lines. For the audio frequency range, the primary parasitic or stray components of concern may be series resistors, inductors, and an equivalent noise current or voltage source, all of which are depicted by dotted lines. The practical limitations that cause the parasitic effects may include spring contacts and board-to-board connectors, including those that are part of a flexible wire circuit that may be needed due to tight and winding confines inside the housing of the host device 10. As to the audio noise source shown, this may be primarily due to the reference contact 15 being shared by both the microphone circuit 20 and one or more speakers 18.

There are different types of microphone-speaker combinations that can be used with the same host connector, each of which may have different types of microphone circuits 20. For example, there are passive microphone circuits that are essentially passive acoustic transducers that produce an analog transducer signal on the microphone contact 16. There are also non-passive or active microphone circuits 20 that drive a modulated signal on the microphone contact 16. In both cases, a dc microphone bias circuit 22 may be needed in the host device 10, coupled to the microphone contact 16' as shown, to provide a dc bias or power supply voltage for operation of the microphone circuits 20.

An attempt to cancel or reduce the noise, which appears in the uplink audio signal and may manifest itself when the far end user hears an echo of his own voice during a telephone call, calls for differentially sensing the microphone signal. As explained above in the Summary section, however, such a technique must be performed carefully else the noise reduction attempt will be ineffective. The different types of microphone circuits 20 present different impedances (both at dc and in the audio range) on the microphone contact 16'. Moreover, there are manufacturing variations in the microphone circuits 20, even for the same make and model of microphone-speaker combination. Thus, knowledge of the precise impedance characteristics of the microphone circuit 20, in addition to a good estimate of the parasitic components that cause a substantial difference between a signal at the output terminal of the microphone circuit 20 and what should be the same signal at the input terminal of the microphone amplifier in the host device 10, are needed. Such detailed knowledge however is not available to a single entity, at the time of manufacture of the host 10 and the microphone-speaker combination 11, because a purchaser of the host device 10 may elect to use any one of a large variety of different types or brands of microphone-speaker combinations including some that may not be available during the time the audio processing functions of the host device 10 are being designed.

Still referring to FIG. 2A, a noise reduction scheme that is more robust, i.e. it will work to provide improved signal to noise ratio and/or reduced far end user echo with several different types of microphone-speaker combinations 11, is now described. In one embodiment, the microphone amplifier is implemented as an operational amplifier (op amp) configured as a difference amplifier, using a network of resistors R1, R2, R3 and R4 and a common mode biasing voltage Vmid (which may be about halfway between Vcc and ground for the op amp). The difference amplifier has first and second inputs, labeled for easier understanding as cold and hot inputs, respectively. In one embodiment, the non-inverting input of the op amp is associated with the cold input and is dc biased to Vmid. The inverting input of the op amp is associated with the hot input and is coupled to receive feedback from the output through R2. The resistance values of R1-R4 and in particular the ratio R1/R2 can be determined in advance of manufacture, to achieve the desired gain that is applied to the microphone signal.

In this embodiment, the hot input of the difference amplifier is AC coupled to a sense point for the microphone contact 16', i.e. through a DC blocking capacitor 23. The capacitor 23 may be coupled as shown, between the mic sense point and the mic bias circuit 22 on the one hand, and the hot input on the other. The cold input of the difference amplifier is coupled to a sense point 27 for the reference contact 15'. This is also an AC coupling, i.e. though a DC blocking capacitor 25. In another embodiment, the coupling between the inputs of the difference amplifier and the microphone and reference sense points may be different, while still having constant gain through the normal and common mode bands of interest.

A fixed attenuator circuit, depicted as a voltage divider having a series resistor Ras and a shunt resistor Rah to ground, serves to attenuate a reference signal from the ref sense point 27, to the cold input of the difference amplifier. Note that in this embodiment, the dc blocking capacitor 25 is coupled between the attenuator and the cold input. The fixed attenuator circuit is also coupled to a switch 24, resulting in what is referred to here as a switched attenuator. The switched attenuator can be placed into at least first and second states, depending on the position of the switch 24. In this embodiment, the switch 24 is coupled between the input of the voltage divider and the ref sense point 27. Alternatively, the switch 24 could be coupled between the output of the voltage divider and the dc blocking capacitor 25.

FIG. 2A has a table that shows the possible states of the switch 24, and the microphone sensing function that is implemented for each state (by the difference amplifier). In the second state (switch 24 is closed), the sense point of the reference contact 15' is coupled to the cold input through the voltage divider (attenuator). This is the differential sensing mode for the difference amplifier, where the attenuation results in improved noise reduction for high impedance microphone circuits 20. In contrast, in the first state (switch 24 is open), the cold input is isolated from the reference sense point. This is the single ended sensing mode for the difference amplifier, where the microphone signal is deemed to be from a low impedance source (in the microphone circuit 20). Enabling the difference amplifier to thus switch between differential and single-ended sensing modes, depending upon the position of the switch 24, yields a more robust solution to the microphone preamp noise cancellation problem as the range of different microphone circuits 20 (and thus microphone-speaker combination types) is increased without a substantial increase in additional circuitry.

To switch between the microphone sensing modes, a controller 26 may be included in the host 10. In one embodiment, the controller 26 automatically detects the type of microphone-speaker combination 11 that is coupled to the host connector and based on a table look up sets the switched attenuator to the first or second state (according to what is indicated in the look up table as being the appropriate state for the given type of microphone-speaker combination). This may be done by using a circuit (not shown) that measures the impedance seen from the host device 10 out through the microphone contact 16', for example relative to the reference contact 15'. The controller 26 would signal the first state (switch 24 closed) when the measured impedance is high, and the second state (switch 24 open) when the impedance is low. Other ways of automatically detecting the microphone-speaker combination type are possible, e.g. by reading a stored digital or analog code value through the speaker contact 14' or the microphone contact 16'. In yet another embodiment, the controller 26 can be operated "manually, by the user": it can set the switched attenuator into the first or second state in response to receiving user input regarding microphone-speaker combination type (e.g., the user could indicate his selection from a stored list of microphone-speaker combination types that are being displayed to him on a display screen of the host device 10). The controller 26 may be implemented as a programmed processor (e.g., an applications processor in a smart phone that is executing software or firmware designed to manage the overall process of switching between the differential and single-ended sensing modes, for improved microphone preamp noise reduction).

Figure 3:
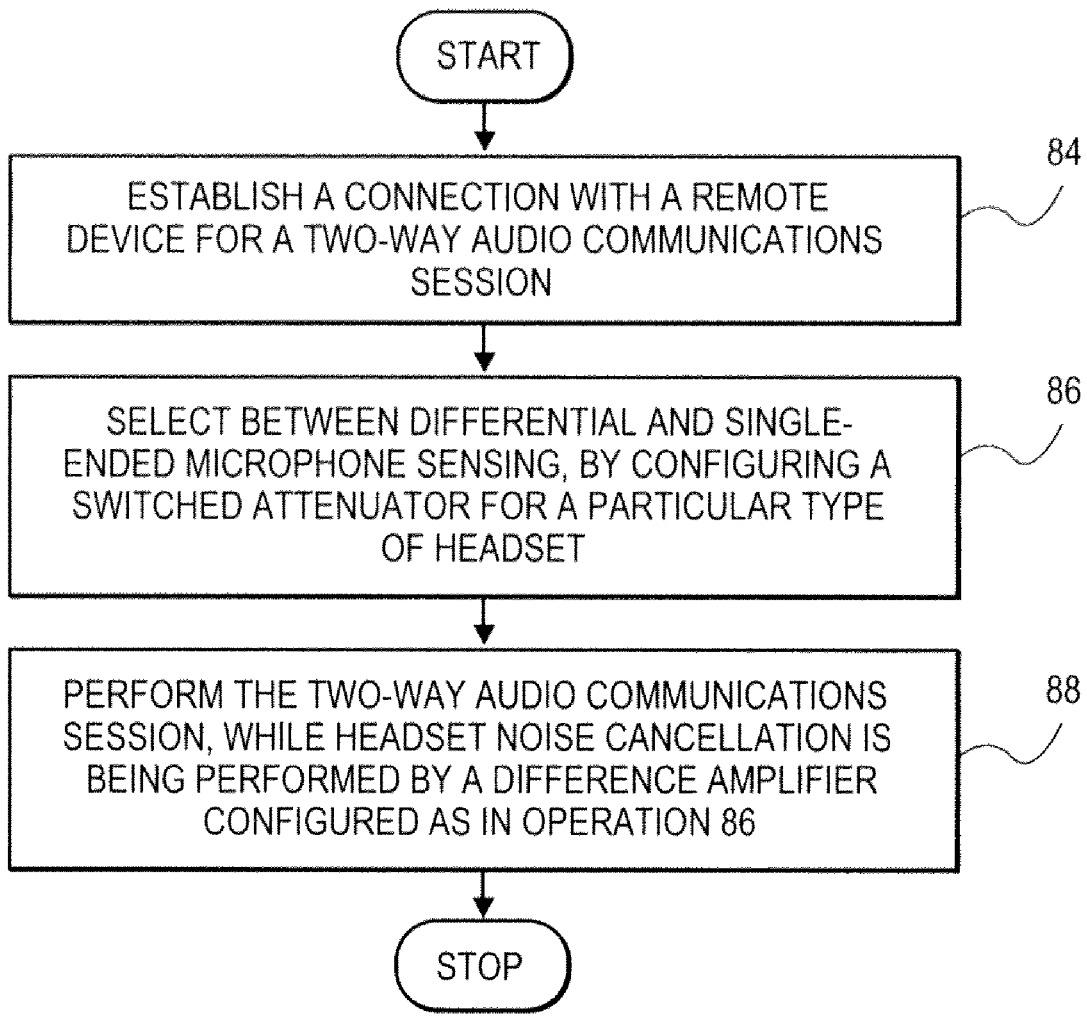
FIG. 3 is a flow diagram of a process for conducting a telephone call with the host device, in accordance with an embodiment of the invention.

FIG. 3 is a flow diagram of a process for conducting a telephone call with the host device 10, in accordance with an embodiment of the invention. Note that the sequence of operations shown in FIG. 3 is not fixed; as explained below, some of these operations may be performed either ahead or after others. Beginning with operation 84, the host device 10 establishes a connection with a remote device for two-way audio communication session (also referred to here as a voice or video telephone call). This may be done by responding to an incoming call signal from a remote host, or initiating a call to a remote host.

In operation 86, the host device 10 selects between differential and single-ended microphone sensing modes for a difference amplifier (in a microphone amplifier block). This occurs by configuring a switched attenuator at an input of the difference amplifier, in accordance with a type of microphone-speaker combination that is to be coupled to the difference amplifier. The output of the difference amplifier provides the uplink audio signal for the telephone call.

Switching "in" the attenuator will cause a fixed attenuation (e.g., using an analog voltage divider) to be applied to a reference sense point signal before input to the difference amplifier—this the differential sensing mode. Switching "out" the attenuator will isolate the reference sense point signal from the input to the difference amplifier—this is the single ended mode. In one embodiment, the attenuator is switched in (differential sensing mode) when the expected microphone circuit (that is coupled to another input of the difference amplifier) has relatively high impedance; the attenuator is switched out (single ended sensing mode) for relatively low impedances.

In operation 88, the telephone call is performed with the benefit of noise cancellation being obtained from the difference amplifier as configured in operation 86. Thus, the far end user of the call should be able to better hear the near end user (in the uplink signal originating at the output of the difference amplifier), with higher signal to noise ratio and/or diminished echo of his own voice.

It should be noted that the selection in operation 86 could occur either before the call is established in operation 84, or it could during the call (e.g., as soon as the conversation begins—during operation 88). The selection may be based on having automatically detected the type of microphone-speaker combination that is coupled to the difference amplifier. Alternatively, the selection may be in accordance with received input from the near end user, regarding the type of speaker-microphone combination that is to be coupled to the difference amplifier (e.g., the type of headset that is to be connected.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the host device is described in several instances as being a portable device, the noise reduction circuitry could also be useful in certain non-portable host devices such as desktop personal computers that also have similar limitations regarding interior signal routing and a shared reference contact in the headset electrical interface. Also, the concept need not be limited to the described combination of one microphone and one or two speakers. The technique disclosed can be used without loss of generality or performance to m microphones and s speakers, requiring, in general between 2(m+s) to m+s+1 separate connections through the headset electrical interface. Finally, although the microphone amplifier block is shown as being implemented with a single op amp, other circuit designs are possible including those that have two or three op amps (for additional performance). The description is thus to be regarded as illustrative instead of limiting.

What is claimed is:

1. An audio device comprising:
   a speaker contact, a microphone contact, and a reference contact, the reference contact being shared by power return terminals of a microphone and a speaker;
   a difference amplifier having a first input and a second input, the second input being coupled to the microphone contact; and
   a switched attenuator circuit that has first and second states, wherein in the first state, the attenuator circuit couples a sense point for the reference contact to the first input, while in the second state the first input is isolated from the reference sense point.

2. The audio device of claim 1 further comprising:
   a controller to set the switched attenuator into the first state when impedance seen from the audio device out through the microphone contact is high, and into the second state when the impedance is low.

3. The audio device of claim 1 further comprising:
   a controller to automatically set the switched attenuator to the first or second state.

4. The audio device of claim 1 further comprising:
   a controller to set the switched attenuator into the first or second state in response to receiving user input.

5. The audio device of claim 1 wherein the difference amplifier has a fixed gain.

6. The audio device of claim 1 wherein the difference amplifier comprises an op amp having a non-inverting input, an inverting input, and an output, wherein the non-inverting input is coupled to a dc bias and to the first input and the inverting input is coupled to receive feedback from the output.

7. The audio device of claim 6 further comprising:
   a first capacitor coupled as a dc block between the first input of the difference amplifier and the switched attenuator circuit; and
   a second capacitor coupled as a dc block between the second input of the difference amplifier and the microphone contact.

8. The audio device of claim 7 further comprising:
   a further dc bias coupled to the microphone contact, the second capacitor being coupled as a dc block between the second input and the further dc bias.

9. A method for operating an audio device, comprising:
   selecting between differential and single-ended microphone sensing modes for a difference amplifier, by configuring a switched attenuator at an input of the difference amplifier in accordance with a type of microphone-speaker combination that is coupled to the difference amplifier;
   establishing a connection with a remote device for a two-way audio communications session; and
   performing the two-way audio communications session using the difference amplifier as configured in accordance with the selected microphone sensing mode.

10. The method of claim 9 further comprising:
    automatically detecting the type of microphone-speaker combination that is coupled to the difference amplifier, wherein the selecting between differential and single-ended modes is in accordance with said automatic detection.

11. The method of claim 9 further comprising:
    receiving user input regarding the type of speaker-microphone combination that is coupled to the difference amplifier, wherein the selection between differential and single-ended modes is in accordance with said received user input.

12. A portable audio device comprising:
    a speaker contact, a microphone contact, and a reference contact, the reference contact being shared by power return terminals of a microphone and a speaker;
    a difference amplifier having a first input and a second input, the second input being coupled to the microphone contact; and
    an attenuator circuit that has first and second states, wherein in the first state, the attenuator circuit couples a sense point for the reference contact to the first input, while in the second state the first input is isolated from the reference sense point.

13. The portable audio device of claim 12 wherein the reference contact is coupled to a ground through a wire path that includes one of a flexible wire circuit, a spring contact and a board to board connector, and wherein the reference sense point is located on the wire path.

14. The portable audio device of claim 12 wherein the attenuator circuit comprises:
    a series resistor;
    a switch coupled to one end of the series resistor; and
    a shunt resistor coupled to another end of the series resistor.

15. The portable audio device of claim 12 further comprising:
    a controller to set the attenuator circuit into the first state when impedance seen through the microphone contact is high, and into the second state when the impedance is low.

* * * * *